United States Patent
vanWelzen (10) Patent No.: US 6,894,695 B2
(45) Date of Patent: May 17, 2005

(54) APPARATUS AND METHOD FOR ACCELERATION OF 2D VECTOR GRAPHICS USING 3D GRAPHICS HARDWARE

(75) Inventor: James vanWelzen, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 511 days.

(21) Appl. No.: 09/844,722

(22) Filed: Apr. 27, 2001

(65) Prior Publication Data
US 2002/0158881 A1 Oct. 31, 2002

(51) Int. Cl.$^7$ .................................................. G06G 5/00
(52) U.S. Cl. ....................... 345/582; 345/418; 345/419; 345/501; 345/503
(58) Field of Search ................................. 345/582, 418, 345/419, 421, 581, 583, 587, 589, 619, 441, 442, 443, 501–503, 506, 552, 545; 382/285, 302, 303, 307

(56) References Cited

U.S. PATENT DOCUMENTS 6,278,645 B1 * 8/2001 Buckelew et al. ..... 365/230.01
6,538,656 B1 * 3/2003 Cheung et al. ............. 345/519

* cited by examiner

Primary Examiner—Matthew C. Bella
Assistant Examiner—Wesner Sajous (57) ABSTRACT

For use in a system capable of creating and displaying vector computer graphics, there is disclosed an apparatus and method for acceleration of 2D vector graphics using both a general purpose computer and conventional 3D graphics hardware. In one advantageous embodiment, the apparatus and method of the present invention comprises a central processing unit (CPU) that is capable of analyzing 2D vector graphic content to create a span stream and a fill palette for each graphics layer of a visual image. The CPU sends the span streams and the fill palettes to a 3D graphics hardware device. Each span stream contains all the information necessary for the 3D graphics hardware device to correctly locate all of the shape boundaries in a graphics layer. Each fill palette contains all the information necessary for the 3D graphics hardware device to correctly fill all of the shape boundaries in each graphics layer. Each fill palette contains information concerning all color gradients, bitmaps, pattern maps, and solid colors that are present in a graphics layer.

24 Claims, 5 Drawing Sheets

APPARATUS AND METHOD FOR ACCELERATION OF 2D VECTOR GRAPHICS USING 3D GRAPHICS HARDWARE

TECHNICAL FIELD OF THE INVENTION

The present invention is directed, in general, to apparatus and methods for creating and displaying computer graphics and, more particularly, to an apparatus and method for accelerating 2D vector graphics using both a general purpose computer and conventional 3D graphics hardware.

BACKGROUND OF THE INVENTION

The two main types of computer graphics representation are raster graphics and vector graphics. Raster graphics represent visual data contributing to a scene as "bitmaps." A bitmap represents a finite but continuous two dimensional (2D) area of color values (commonly including, but not limited to, rectangular areas) as an array of discrete picture elements ("pixels"). This discretization of continuous color implies particular horizontal and vertical resolutions (i.e., number of color samples per unit length of display). Therefore, any single bitmap has a fixed display resolution.

Vector graphics represent visual data contributing to a scene in forms independent of any particular display resolution. These forms commonly include, but are not limited to, two dimensional (2D) and three dimensional (3D) polygonal geometry and continuous curves and surfaces. Vector graphics specify polygonal vertices in a space independent of display resolution (e.g., a Cartesian space). Vector graphics specify curves and surfaces as mathematical functions or data points (again, in a space independent of display resolution) that imply mathematical functions. Any vector graphics component (e.g., a line, a curve, a shape, or a surface) defines a continuous area of color (or a continuous boundary of an area of color) that may be discretized into any arbitrary resolution at the time of display (a process commonly referred to as rasterization).

Two dimensional (2D) vector graphics define a scene by layering 2D planes of color. Each plane of color is composed of some set of planar shapes. The boundaries of a given shape are defined by vector graphics. For example, the Macromedia Flash Internet plug-in uses quadratic bezier curves as shape boundaries. The interior color that fills a given shape may be defined as a solid color, a color gradient, a pattern, or a bitmap. Therefore, the specification of a single 2D vector graphics image includes the complete set of shape boundaries and associated interior fills that contribute to the image.

The mathematical calculations that are required to represent the various geometric shapes and colors of a vector graphic are usually performed using powerful computer software programs in general purpose computer microprocessors. The computing power of most of today's general purpose computer microprocessors is sufficient to create and display vector graphics in a timely manner. That is, the speed with which vector graphics are created and displayed generally meets the performance levels demanded by most computer graphics application programs.

Not all devices have a full sized general purpose computer microprocessor. For example, information appliances for browsing the Internet typically have inadequate general purpose computing resources to create and display vector graphics at speeds that are comparable to full size personal computers. Information appliances include, without limitation, personal digital assistants (PDAS), Pocket PCs, Web PADs, thin clients, and set top boxes. These types of relatively low priced devices are constrained in their operation by low power, limited capability, and small size. These types of devices are meant to be smaller and less costly than full size personal computers. These constraints ultimately result in microprocessors in information appliances having much less performance capability than microprocessors typically used in personal computers.

Microprocessors in information appliances also tend to be highly integrated in order to satisfy the applicable design constraints. For example, System on a Chip ("SOC") technology has been developed by National Semiconductor Corporation and others. The System on a Chip technology often integrates graphics acceleration hardware. Two dimensional (2D) graphic acceleration hardware is common and three dimensional (3D) graphic acceleration hardware is becoming more common.

There exists a class of information appliance devices that have (1) moderate general purpose computing resources, (2) three dimensional (3D) graphic acceleration hardware, and (3) a requirement to display Internet content as the same level as a full size personal computer.

There is therefore a need for an apparatus and method for accelerating the creation and display of 2D vector graphics in devices that do not have the computing power of a full sized general purpose computer microprocessor. In particular, there is a need for an apparatus and method for accelerating the creation and display of 2D vector graphics without relying completely upon software implementation.

SUMMARY OF THE INVENTION

It is an object of the present invention to provide an improved system and method for accelerating the creation and display of 2D vector graphics.

It is also an object of the present invention to provide an improved system and method for accelerating the creation and display of 2D vector graphics without relying completely upon software implementation.

In one advantageous embodiment, the apparatus and method of the present invention comprises a central processing unit (CPU) that is capable of analyzing 2D vector graphic content to create a span stream for each graphics layer of a visual image. The CPU sends the span streams to a 3D graphics hardware device. Each span stream contains all the information necessary for the 3D graphics hardware device to locate all of the shape boundaries in a graphics layer.

In another advantageous embodiment, the apparatus and method of the present invention comprises a central processing unit (CPU) that is capable of analyzing 2D vector graphic content to create a fill palette for each graphics layer of a visual image. The CPU stores the fill palettes in a texture map memory and sends the fill palettes to a 3D graphics hardware device. The fill palettes contain all the information necessary for the 3D graphics hardware device to fill all of the shape boundaries in each graphics layer. A fill palette contains information concerning all color gradients, bitmaps, pattern maps, and solid colors that are present in a graphics layer.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, one particular type of system for accelerating vector graphics. Those skilled in the art will recognize that the exemplary embodiment of the present invention may easily be modified for use in other types of systems for accelerating vector graphics.

Figure 1:
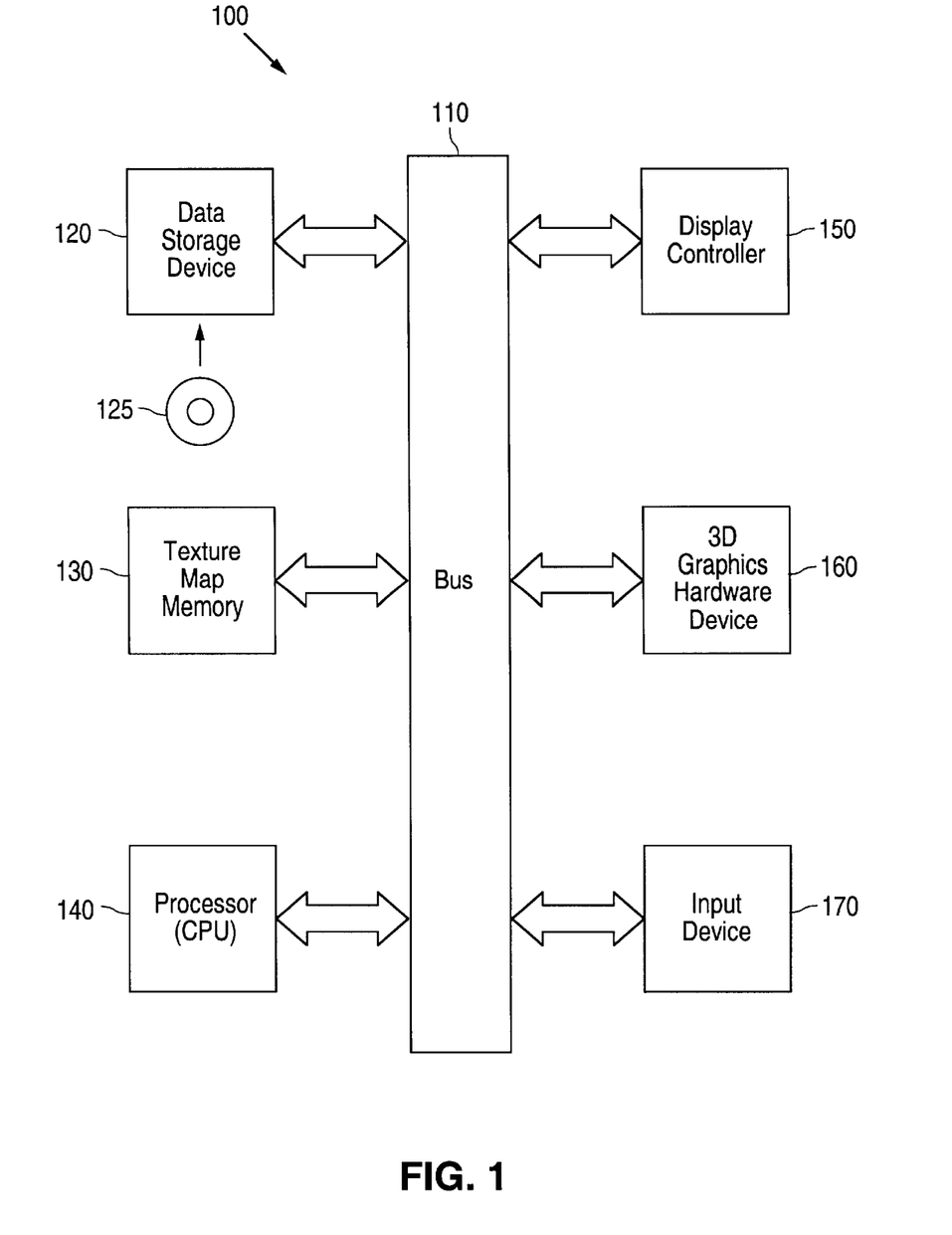
FIG. 1 illustrates a block diagram of an exemplary system of the present invention for acceleration of 2D vector graphics using 3D graphics hardware.
Figure 2:
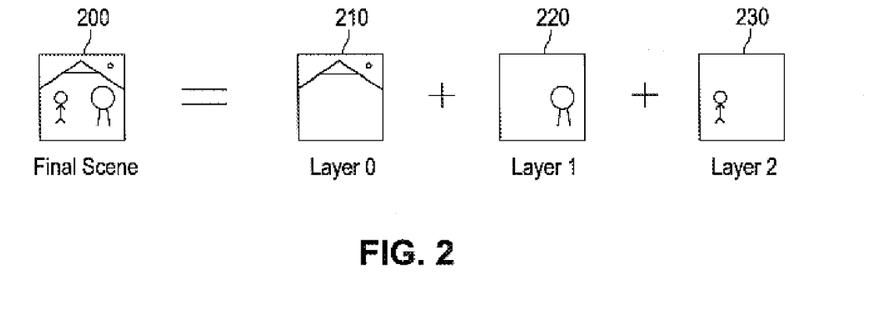
FIG. 2 illustrates an exemplary visual image and the component layers that make up the exemplary visual image.

FIG. 1 illustrates a block diagram of an exemplary system 100 for accelerating 2D vector graphics in accordance with the principles of the present invention. System 100 comprises computer bus 110 that connects the various components of system 100. System 100 generally comprises data storage device 120, texture map memory 130, central processing unit (CPU) 140 (also referred to as processor (CPU) 140), display controller 150, 3D graphics hardware device 160, and input device 170. As shown in FIG. 1, computer bus 110 permits computer communication between each of the various components of system 100.

Each of the components of system 100 may access data storage device 120 through computer bus 110. Data storage device 120 may comprise random access memory (RAM) or a combination of read only memory (ROM) and random access memory (RAM). Data storage device 120 may comprise a non-volatile random access memory (RAM), such as flash memory. Data storage device 120 may comprise a mass storage data device, such as a hard disk drive (not shown). Data storage device 120 may also comprise an attached peripheral drive or removable disk drive (whether embedded or attached) that reads read/write DVDs or re-writable CD-ROMs. As illustrated in FIG. 1, removable disk drives of this type are capable of receiving and reading re-writable CD-ROM disk 125.

Processor (CPU) 140 may receive 2D vector graphic content from an input file stored in data storage device 120. Alternatively, processor (CPU) 140 may receive 2D vector graphic content from input device 170. Input device 170 may comprise any type of device that is capable of providing vector graphic content. For example, input device 170 may comprise a network interface to an external network such as the Internet. In an embodiment where input device 170 is coupled to the Internet, input device 170 is capable of providing a continuing stream of 2D vector graphic content to processor (CPU) 140.

As will be more fully described, processor (CPU) 140 is capable of creating software files called "fill palettes" to be used in the creation and display of 2D vector graphic content. Processor (CPU) 140 stores the fill palettes in texture map memory 130. Texture map memory 130 may comprise random access memory (RAM) or a combination of read only memory (ROM) and random access memory (RAM). Texture map memory 130 may comprise a non-volatile random access memory (RAM), such as flash memory.

As will also be more fully described, 3D graphics hardware device 160 is capable of using the fill palettes in texture map memory 130 to create and display 2D vector graphic content. The 2D vector graphic content generated by system 100 is sent to display controller 150 for ultimate display on a display device (not shown) such as an analog cathode ray tube or a digital display device.

As is well known in the art, a visual image is composed of a number of components. As an example, consider final scene 200 shown in FIG. 2. Final scene 200 depicts a person and a tree in front of a mountain background. Final scene 200 may be considered to be the sum of three individual images. The first image 210 (layer 0) depicts the mountain background. The second image 220 (layer 1) depicts the tree. The third image 230 (layer 2) depicts the man. Layer 0, layer 1, and layer 2 are added to make up final scene 200.

As is also well known in the art, the vector graphics technique for generating computer graphics utilizes various types of fills bounded by various types of curves. Depending upon the particular implementation involved, a vector graphics device maintains a set of curves and fills (e.g., colors, patterns) that are actively in use. In some cases the set of curves and fills includes all objects that contribute to the visual image. In other cases the set of curves and fills will be limited to a single object in the visual image.

In addition, there are different ways in which vector graphics may be rasterized. For example, the Macromedia Flash Internet plug-in device uses a scanline rendered that writes each pixel of the final visual image in order only once. Other types of devices use intermediate images and write pixels multiple times out of order. In any event, the task of creating vector graphics generally comprises the steps of: (1) defining all of the shape boundaries by traversing active curves, and (2) filling the interiors of the shape boundaries.

The traversal of curves is almost always done in software. Although traversal of straight lines may be effectively achieved in hardware, many types of curves exist that are impractical to traverse with hardware techniques. Therefore, software techniques are preferred for the task of curve traversal.

Graphics hardware techniques, however, are preferred for the task of filling the interior of the shape boundaries formed by the curves. This task is sometimes referred to as "painting pixels." The task often involves filling the bounded area of a curve with a solid color, a pattern, a gradient, or a bitmap fill.

Figure 3:
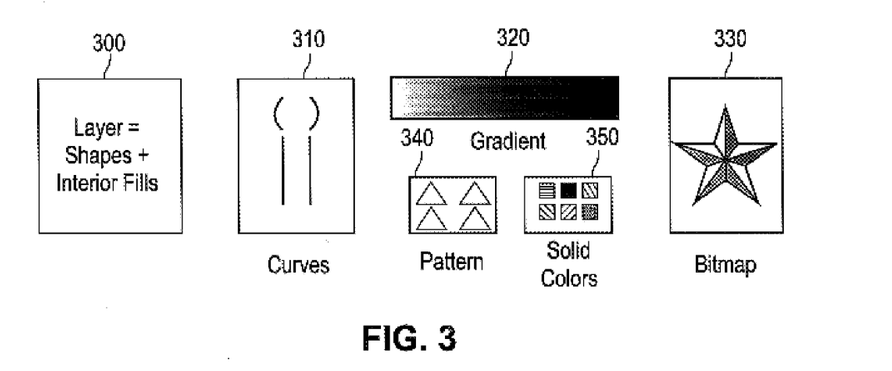
FIG. 3 illustrates exemplary elements of shapes and fills of a layer of a visual image including curves, gradient, bitmap, pattern, and solid colors.

For example, FIG. 3 schematically illustrates how an individual graphics layer 300 of a visual image may be created by combining shapes and interior fills. Information concerning the shapes and interior fills are stored in software locations. In the example shown in FIG. 3, information concerning the shapes of the curves is stored in location 310. Information concerning the gradient is stored in location 320. Information concerning a bitmap fill is stored in location 330. Information concerning a pattern is stored in location 340. Information concerning solid colors is stored in location 350. In prior art systems, the information stored in locations 310 through 350 are stored within a large set of data structures that hold all of the fill information.

In contrast, the apparatus and method of the present invention uses only a single texture map and some very simple data structures that contain winding rules and status for each type of fill. The apparatus and method of the present invention renders graphic objects one layer at a time using the following five (5) steps.

Figure 4:
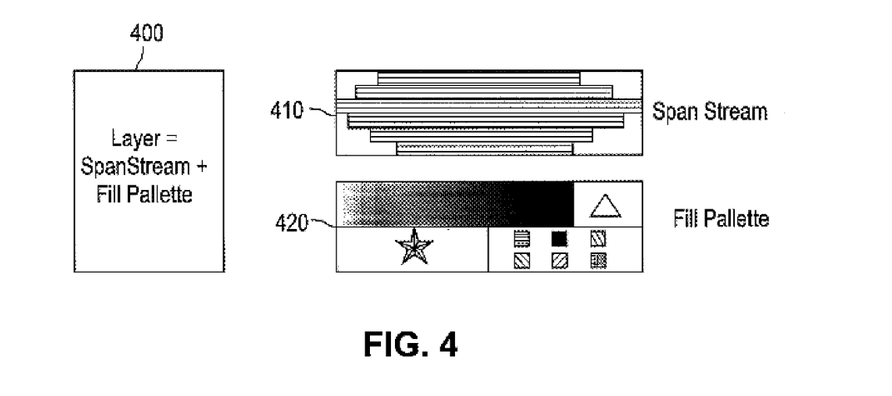
FIG. 4 illustrates an exemplary span stream and an exemplary fill palette for a layer of a visual image in accordance with the principles of the present invention.
Figure 5:
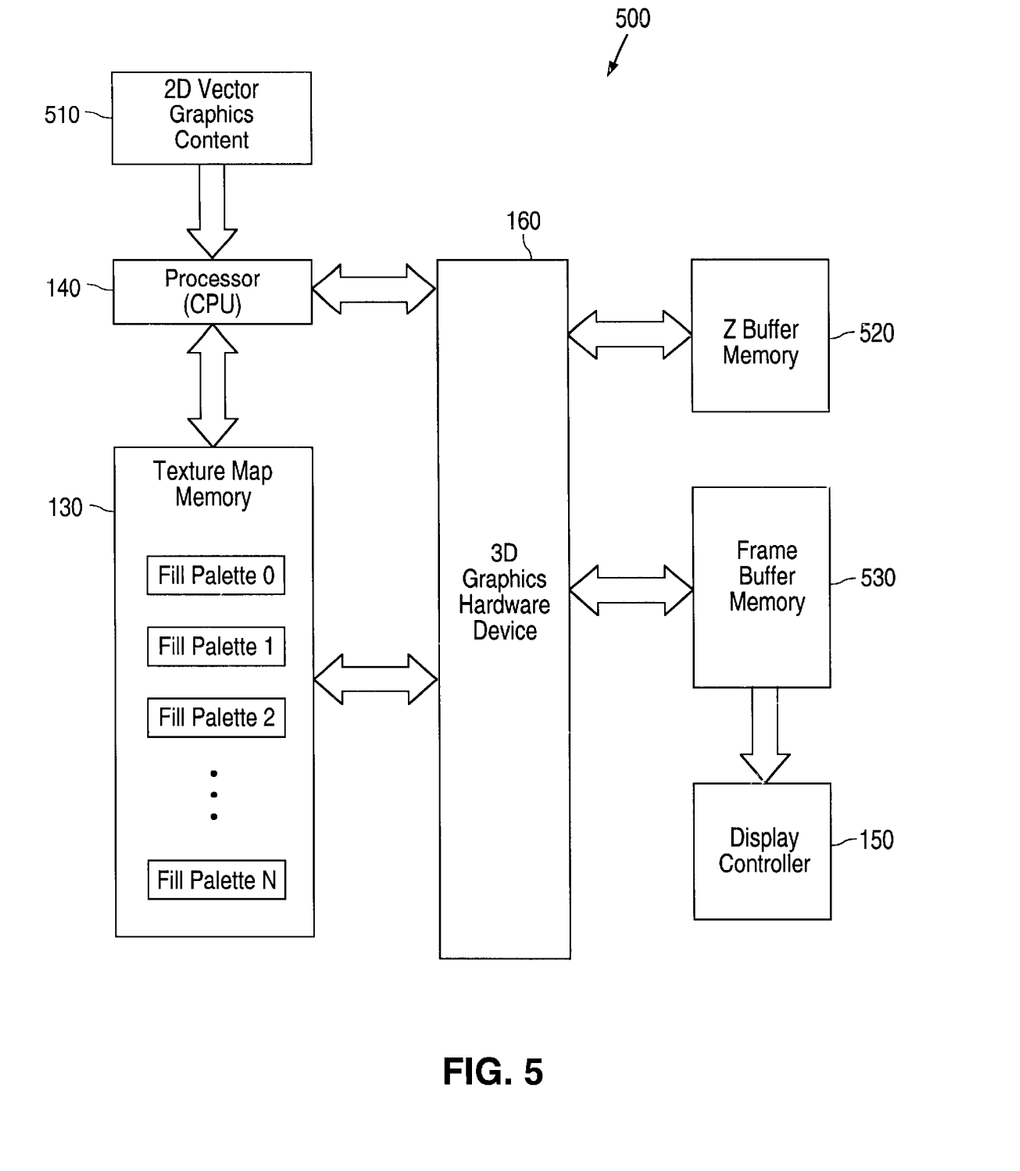
FIG. 5 illustrates a more detailed block diagram of an exemplary system of the present invention for the acceleration of 2D vector graphics using 3D graphics hardware.

First, all solid colors, gradient maps, pattern maps, and bitmaps that are used in the graphics layer are packed into a single texture map called a "fill palette." FIG. 4 depicts an exemplary fill palette 420 of the present invention. Fill palette 420 contains information relating to the gradient in location 320, the bitmap in location 330, the pattern map in location 340, and the solid colors in location 350. Processor (CPU) 140 creates a fill palette for each graphics layer and stores the fill palettes in texture map memory 130. As shown in FIG. 5, 3D graphics hardware device 160 is capable of accessing all of the fill palettes stored in texture map memory 130. A fill palette for each graphics layer is provided to 3D graphics hardware device 160 to give 3D graphics hardware device 160 all of the information necessary to correctly fill all of the shape boundaries in each graphics layer.

Second, processor (CPU) 140 sends to 3D graphics hardware device 160 additional information concerning the winding rules of the fills. The winding rules of the fills are maintained by the programmable front end of 3D graphics hardware device 160.

Third, a software application running on processor (CPU) 140 performs the task of traversing the curves in the graphics layer. Processor (CPU) 140 computes the boundaries of all shapes used in the graphics layer. Processor (CPU) 140 forms the resulting shape data into a data structure called a "span stream." For each scanline of the graphics layer, the position and attributes of each curve that intersects the scanline is recorded in the "span stream" data structure in order of occurrence on the scanline. This provides a list of "span" structures in which each "span" structure consists of a location (e.g., a value for "x" along an "x-axis" coincident with the scanline) and a pointer to the fill that follows that location (e.g., that follows that "x" value). The span stream is therefore made up of (1) the starting "x" value on the scanline, and (2) the starting texture coordinates (U and V), and (3) the derivatives of the starting texture coordinates (dU and dV).

Processor (CPU) 140 creates a span stream for all of the scanlines in a graphics layer and sends the span stream to 3D graphics hardware device 160. As shown in FIG. 5, 3D graphics hardware device 160 is capable of receiving the span streams directly from processor (CPU) 140. A span stream for each graphics layer is provided to 3D graphics hardware device 160 to give 3D graphics hardware device 160 all of the information necessary to correctly locate all of the shape boundaries in each graphics layer.

FIG. 4 schematically illustrates how an individual graphics layer 400 of a visual image may be created by using information from span streams and fill palettes. Information concerning the shape boundaries is located in span stream 410. Information concerning the gradient, the bitmap fill, the pattern elements, and the solid colors is stored in fill palette 420.

Fourth, the programmable front end of 3D graphics hardware device 160 parses the span stream and submits individual texture mapped spans to a rasterizer. The programmable front end of 3D graphics hardware device 160 needs only to (1) track the state of the fills and (2) compute span length. Because most fills toggle on and off each time an associated boundary is crossed, the state of the fills may be easily determined. The span length may be computed by simply calculating the difference between the last two location values (e.g., the last two "x" values).

Fifth, the rasterizer within 3D graphics hardware device 160 paints each span of span stream 410 using fill palette texture map 420.

Each fill type is represented by fill palette 420 in the following manner:

(1) Solid color. Each solid color that is used in the current graphics layer is represented by a single texel. For areas that are filled with solid color, point sampled texture mapping is used. The color is referred to by its U and V coordinates and the derivatives of U and V are set equal to zero.

(2) Gradient. The gradient reference is painted into fill palette 420. For areas that are filled with gradient, bi-linearly filtered texture mapping is used. The values of U and V and the values of the derivatives of U and V are set so that the gradient is traversed in an appropriate way.

(3) Pattern. The pattern reference is painted into fill palette 420. For areas that are filled with pattern, bi-linearly filtered texture mapping is used. The values of U and V and the values of the derivatives of U and V are set so that the pattern is traversed in an appropriate way.

(4) Bitmap. The bitmap reference is painted into fill palette 420. For areas that are filled with bitmap, bi-linearly filtered texture mapping is used. The values of U and V and the values of the derivatives of U and V are set so that the bitmap is traversed in an appropriate way.

The use of fill palettes in the apparatus and method of the present invention provides several advantages. First, the use of fill palettes significantly reduces the complexity of various types of fills and reduces the level of complexity presented to 3D graphics hardware device 160. Second, the use of a single fill palette (texture map) improves the locality of reference for texture mapping in general. Third, there is no additional cost in terms of computational or memory bandwidth to create the fill palettes. JPEG translation for bitmaps must be carried out anyway. The cost of creating a single texel for each solid color is negligible. Fourth, the size of fill palettes will be fairly small. Vector graphics tend to use a small subset of solid colors frequently, one or two gradients infrequently, and bitmaps very infrequently. Fifth, fill palettes will be created once and used repeatedly. Vector graphics use the same objects over and over.

The use of span streams in the apparatus and method of the present invention also provides several advantages. First, a span stream can represent arbitrary boundaries. 3D graphics hardware device 160 will not have to concern itself with traversal of complicated curves and shapes. This task is performed in software. Second, use of span streams requires lover memory overhead for the front end of 3D graphics hardware device 160. That is, the front end of 3D graphics hardware device 160 will not need to retain large amounts of data associated with curve position and attributes. Third, the use of span streams is highly compatible with FlashPlayer implementations. The algorithm used in the FlashPlayer maintains active edges in a form similar to a span stream. Fourth, the use of span streams rasterizes in pixel order. This amounts to sequential frame buffer access within each layer.

FIG. 5 illustrates one exemplary advantageous embodiment of the apparatus and method of the present invention. The elements of this exemplary advantageous embodiment are collectively referred to with reference numeral 500. As shown in FIG. 5, processor (CPU) 140 receives 2D vector graphics content 510. Processor (CPU) 140 may comprise an x86 core from National Semiconductor, Intel, Transmeta, or Advanced Micro Devices. Processor (CPU) 140 may comprise a stand alone processor or may be integrated with other components. Processor (CPU) 140 may also be part of a System on a Chip ("SOC").

Processor (CPU) 140 creates fill palettes from the 2D vector graphics content 510 and sends the fill palettes to texture map memory 130. As shown in FIG. 5, texture map memory 130 contains fill palette 0, fill palette 1, fill palette 2, . . . , fill palette N. As previously mentioned, processor (CPU) 140 creates and stores a fill palette for each graphic layer of a visual image. The fill palettes are accessed by 3D graphics hardware device 160. Texture map memory 130 may comprise random access memory (RAM). Unified memory architectures (UMA) (which are common in information appliances and in Systems on a Chip) may use a section of system memory for texture map memory 130.

Processor (CPU) 140 creates span streams from the 2D vector graphics content 510 and sends the span streams to 3D graphics hardware device 160. 3D graphics hardware device 160 contains the necessary logic to perform the actual drawing process. 3D graphics hardware device 160 may comprise a stand alone device or may be integrated with other components. Stand alone graphics hardware devices can be in a PCI/AGP card or on the motherboard. Integrated solutions tend to hand off the internal bus.

In some types of systems, a Z buffer memory 520 may be provided to contain data concerning depth values. Although the presence of Z buffer memory 520 is common in 3D graphics devices, Z buffer memory 520 is not a part of the present invention.

Also as shown in FIG. 5, 3D graphics hardware device 160 is coupled to frame buffer memory 530. Frame buffer memory 530 contains the pixels that result after 3D graphics hardware device 160 has created the vector graphic displays from the fill palettes and the span streams of the present invention. Frame buffer memory 530 sends the completed vector graphic displays to display controller 150. Display controller 150 feeds a display device (not shown). The display device may comprise a combination of a digital to analog converter and an analog cathode ray tube. The display device may also comprise a digital panel (e.g., TFT).

Figure 6:
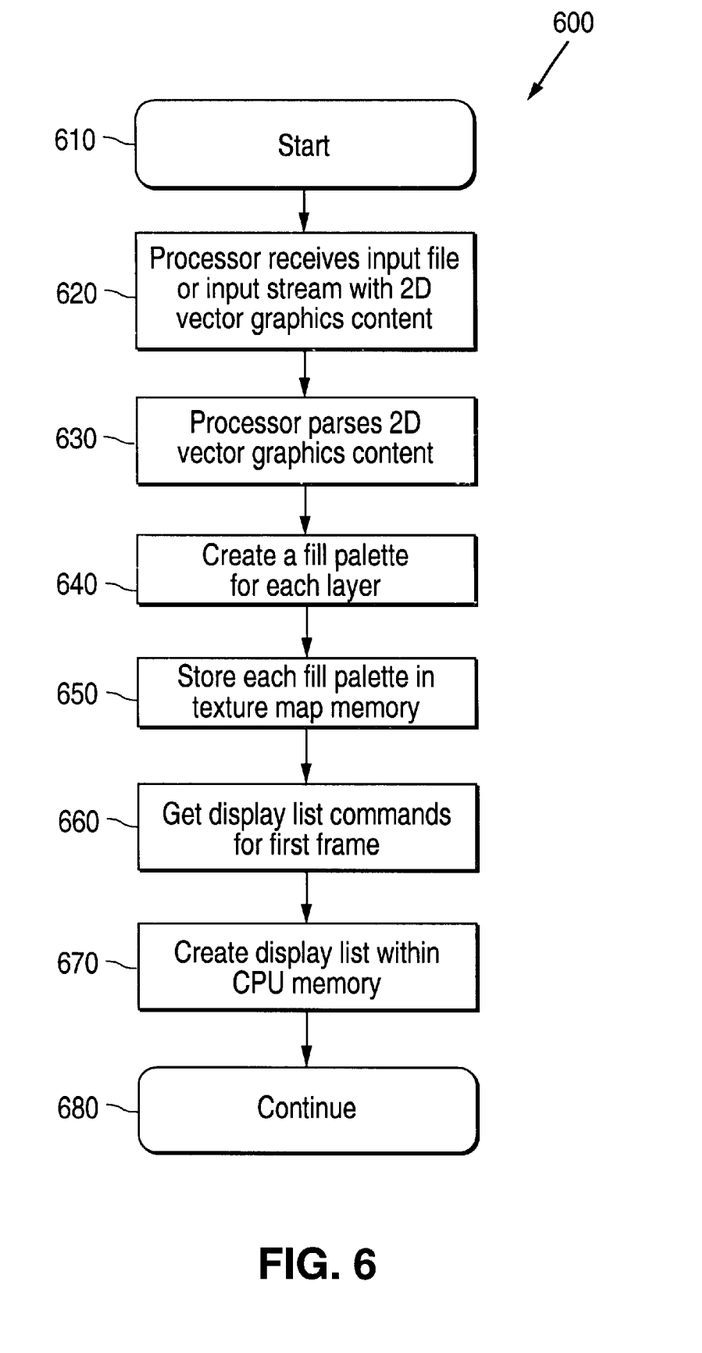
FIG. 6 illustrates a flow diagram showing an advantageous embodiment of a first portion of the method of the present invention.

FIG. 6 illustrates a flow diagram showing an advantageous embodiment of a first portion of the method of the present invention. The steps of the first portion of the method are collectively referred to with the reference numeral 600. At the start of the method (step 610), processor (CPU) 140 receives 2D vector graphics content 510 from data storage device 120 or input device 170 (step 620). Processor (CPU) 140 then parses the 2D vector graphics content into layers (step 630). Processor (CPU) 140 then creates a fill palette 420 for each layer (step 640). Processor (CPU) 140 then stores each fill palette 420 in the texture map memory 130 associated with the 3D graphics hardware device 160 (step 650). Processor (CPU) 140 then gets display list commands for all layers in the first frame (step 660). Processor (CPU) 140 then places all display list commands (ordered by layer from back to front) into a display list within CPU memory (step 670). The first portion of the method is then continued in the second portion of the method shown in FIG. 7 (step 680).

Figure 7:
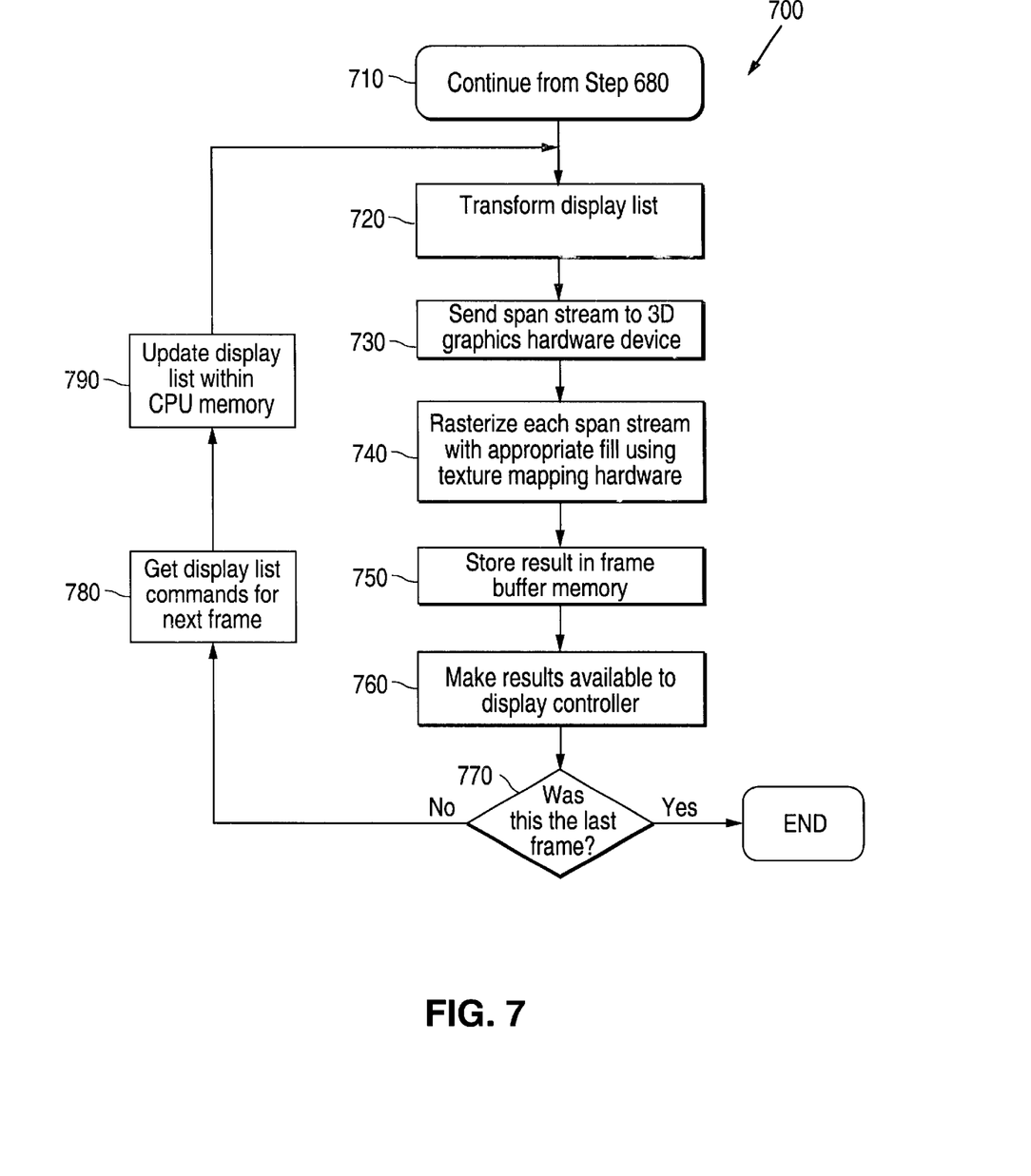
FIG. 7 illustrates a flow diagram showing an advantageous embodiment of a second portion of the method of the present invention.

FIG. 7 illustrates a flow diagram showing an advantageous embodiment of a second portion of the method of the present invention. The steps of the second portion of the method are collectively referred to with the reference numeral 700. At the start of the second portion of the method (step 710), processor (CPU) 140 transforms the display list for the frame (step 720). Processor (CPU) 140 then sends span stream 410 to 3D graphics hardware device 160 (step 730). 3D graphics hardware device 160 then rasterizes each span in span stream 410 with the appropriate fill palette 420 (step 740).

3D graphics hardware device 160 then stores the result in frame buffer memory 530 (step 750). 3D graphics hardware device 160 then makes the results available to display controller 150 (step 760). Display controller 150 decides when to read the contents of frame buffer memory 530 based on the display refresh rate.

In one advantageous embodiment of the present invention, frame buffer memory 530 is "double buffered." That is, frame buffer memory 530 comprises two buffers (not shown). 3D graphics hardware device 160 is capable of writing to one of the buffers while display controller 150 is reading the contents of the other buffer. 3D graphics hardware device 160 and display controller 150 switch back and forth between the two buffers.

In an alternate advantageous embodiment, 3D graphics hardware device 160 writes to an "off screen" buffer (not shown) and rasterizes the vector graphics data. 3D graphics hardware device 160 then copies the contents of the "off screen" buffer to frame buffer memory 530 when it has completed the rasterization process. The step of making the results available to display controller 150 (step 760) may comprise switching from a first buffer to a second buffer in the "double buffer" case. Alternatively, the step of making the results available to display controller 150 (step 760) may comprise copying the contents of the "off screen" buffer to frame buffer memory 530 in the "off screen buffer" case.

A determination is then made whether the frame just processed was the last frame in the vector graphics content (decision step 770). If the frame is not the last frame, then processor (CPU) 140 gets the display list commands for the next frame (step 780). Processor (CPU) 140 then updates the display list within CPU memory (step 790). Control then returns to step 720 to process the next frame. If the frame is the last frame, then the method steps end.

The present invention is not limited to accelerating a single 2D vector graphic image. The present invention is capable of accelerating a series of 2D vector graphics images of the type that represent a moving picture or animation.

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. For use in a system capable of creating and displaying vector computer graphics, an apparatus for acceleration of 2D vector graphics, said apparatus comprising:
    a processor capable of receiving 2D vector graphic content;
    a 3D graphics hardware device coupled to said processor;
    wherein said processor is capable of creating a span stream for a graphics layer of a visual image of said 2D vector graphic content, said processor is also capable of providing said span stream to said 3D graphics hardware device, and said span stream identifies a position and at least one attribute of each of at least one curve that intersects a scanline of said graphics layer; and
    wherein said 3D graphics hardware device is capable of using said span stream to locate shape boundaries in said graphics layer.

2. The apparatus as claimed in claim 1 wherein said processor is capable of creating a fill palette for a graphics layer of said visual image and is capable of providing said fill palette to said 3D graphics hardware device; and
    wherein said 3D graphics hardware device is capable of using said fill palette to fill said shape boundaries in said graphics layer.

3. The apparatus as claimed in claim 2 wherein said fill palette contains texture map information of said graphics layer.

4. The apparatus as claimed in claim 3 wherein said texture map information of said graphics layer comprises one of: gradient information, bitmap information, pattern information, and solid color information.

5. The apparatus as claimed in claim 2 further comprising:
    a texture map memory coupled to said processor and coupled to said 3D graphics hardware device, said texture map memory capable of receiving a plurality of fill palettes from said processor and capable of providing said plurality of fill palettes to said 3D graphics hardware device.

6. The apparatus as claimed in claim 1 wherein said span stream comprises a location associated with the scanline, texture coordinates associated with the scanline, and derivatives of the texture coordinates.

7. A system capable of creating and displaying vector computer graphics, said system comprising an apparatus for acceleration of 2D vector graphics, said apparatus comprising:
    a processor capable of receiving 2D vector graphic content;
    a 3D graphics hardware device coupled to said processor;
    wherein said processor is capable of creating a span stream for a graphics layer of a visual image of said 2D vector graphic content, said processor is also capable of providing said span stream to said 3D graphics hardware device, and said span stream identifies a position and at least one attribute of each of at least one curve that intersects a scanline of said graphics layer; and
    wherein said 3D graphics hardware device is capable of using said span stream to locate shape boundaries in said graphics layer.

8. The system as claimed in claim 7 wherein said processor is capable of creating a fill palette for a graphics layer of said visual image and is capable of providing said fill palette to said 3D graphics hardware device; and
    wherein said 3D graphics hardware device is capable of using said fill palette to fill said shape boundaries in said graphics layer.

9. The system as claimed in claim 8 wherein said fill palette contains texture map information of said graphics layer.

10. The system as claimed in claim 9 wherein said texture map information of said graphics layer comprises one of: gradient information, bitmap information, pattern information, and solid color information.

11. The system as claimed in claim 8 further comprising:
    a texture map memory coupled to said processor and coupled to said 3D graphics hardware device, said texture map memory capable of receiving a plurality of fill palettes from said processor and capable of providing said plurality of fill palettes to said 3D graphics hardware device.

12. The system as claimed in claim 7 wherein said span stream comprises a location associated with the scanline, texture coordinates associated with the scanline, and derivatives of the texture coordinates.

13. For use in a system capable of creating and displaying vector computer graphics, a method for accelerating 2D vector graphics, said method comprising the steps of:
    receiving 2D vector graphic content in a processor;
    creating a span stream for a graphics layer of a visual image of said 2D vector graphic content, wherein said span stream identifies a position and at least one attribute of each of at least one curve that intersects a scanline of said graphics layer; and
    using said span stream in a 3D graphics hardware device to locate shape boundaries in said graphics layer.

14. The method as claimed in claim 13 further comprising the steps of:
    creating a fill palette for said graphics layer of said visual image; and
    using said fill palette in a 3D graphics hardware device to fill said shape boundaries in said graphics layer.

15. The method as claimed in claim 14 wherein said fill palette contains texture map information of said graphics layer.

16. The method as claimed in claim 15 wherein said texture map information of said graphics layer comprises at least one of: gradient information, bitmap information, pattern information, and solid color information.

17. The method as claimed in claim 14 further comprising the steps of:
   receiving a plurality of fill palettes from said processor in a texture map memory; and
   providing said plurality of fill palettes to said 3D graphics hardware device from said texture map memory.

18. The method as claimed in claim 13 wherein said span stream comprises a location associated with the scanline, texture coordinates associated with the scanline, and derivatives of the said texture coordinates.

19. For use in a system capable of creating and displaying vector computer graphics, computer-executable instructions stored on a computer-readable storage medium for accelerating 2D vector graphics, the computer-executable instructions comprising the steps of:
   receiving 2D vector graphic content in a processor;
   creating a span stream for a graphics layer of a visual image of said 2D vector graphic content, wherein said span stream identifies a position and at least one attribute of each of at least one curve that intersects a scanline of said graphics layer; and
   using said span stream in a 3D graphics hardware device to locate shape boundaries in said graphics layer.

20. The computer-executable instructions stored on a computer-readable storage medium as claimed in claim 19 further comprising the steps of:
   creating a fill palette for said graphics layer of said visual image; and
   using said fill palette in a 3D graphics hardware device to fill said shape boundaries in said graphics layer.

21. The computer-executable instructions stored on a computer-readable storage medium as claimed in claim 20 wherein said fill palette contains texture map information of said graphics layer.

22. The computer-executable instructions stored on a computer-readable storage medium as claimed in claim 21 wherein said texture map information of said graphics layer comprises at least one of: gradient information, bitmap information, pattern information, and solid color information.

23. The computer-executable instructions stored on a computer-readable storage medium as claimed in claim 20 further comprising the steps of:
   receiving a plurality of fill palettes from said processor in a texture map memory; and
   providing said plurality of fill palettes to said 3D graphics hardware device from said texture map memory.

24. The computer-executable instructions stored on a computer-readable storage medium as claimed in claim 19 wherein said span stream comprises a location associated with the scanline, texture coordinates associated with the scanline, and derivatives of the texture coordinates.

\* \* \* \* \*

UNITED STATES PATENT AND TRADEMARK OFFICE
CERTIFICATE OF CORRECTION

PATENT NO. : 6,894,695 B2
DATED : May 17, 2005
INVENTOR(S) : James van Welzen

It is certified that error appears in the above-identified patent and that said Letters Patent is hereby corrected as shown below:

Column 9,
Line 62, insert -- at least -- before "one".

Column 11,
Line 17, delete "said" before "texture".

Signed and Sealed this

Twenty-eighth Day of February, 2006

JON W. DUDAS
*Director of the United States Patent and Trademark Office*